(12) United States Patent
Schmidt et al.

(10) Patent No.: US 9,147,175 B2
(45) Date of Patent: Sep. 29, 2015

(54) DYNAMIC INVENTORY TRACKING AND TRANSFER SYSTEM

(71) Applicant: Mi-Jack Products, Inc., Hazel Crest, IL (US)

(72) Inventors: Harvey Edward Schmidt, Flossmoor, IL (US); Daniel Brian Zakula, Sr., Mokena, IL (US); Darren Cosandier, Burgberg (DE)

(73) Assignee: Mi-Jack Products, Inc., Hazel Crest, IL (US)

( * ) Notice: Subject to any disclaimer, the term of this patent is extended or adjusted under 35 U.S.C. 154(b) by 0 days.

(21) Appl. No.: 13/827,261

(22) Filed: Mar. 14, 2013

(65) Prior Publication Data

US 2014/0279292 A1 Sep. 18, 2014

(51) Int. Cl.
 *G06G 1/14* (2006.01)
 *G06Q 20/00* (2012.01)
 *G06Q 10/08* (2012.01)
 *G06Q 10/00* (2012.01)

(52) U.S. Cl.
 CPC .................................. *G06Q 10/087* (2013.01)

(58) Field of Classification Search
 CPC ......... B66C 13/46; G06Q 10/08; G06Q 50/30
 See application file for complete search history.

(56) References Cited

U.S. PATENT DOCUMENTS

| | | | |
|---|---|---|---|
| 3,480,174 A * | 11/1969 | Sherwood | ....................... 220/1.5 |
| 5,804,810 A | 9/1998 | Woolley et al. | |
| 6,204,813 B1 | 3/2001 | Wadell et al. | |
| 6,429,810 B1 | 8/2002 | De Roche | |
| 6,654,481 B2 | 11/2003 | Amemiya et al. | |
| 7,032,763 B1 | 4/2006 | Zakula, Sr. et al. | |
| 7,344,037 B1 * | 3/2008 | Zakula et al. | .................. 212/344 |
| 7,639,135 B2 | 12/2009 | Arms et al. | |
| 7,916,026 B2 | 3/2011 | Johnson et al. | |
| 8,055,554 B2 | 11/2011 | Zakula, Sr. et al. | |
| 8,111,157 B2 | 2/2012 | Diener et al. | |
| 8,138,917 B2 | 3/2012 | Diener et al. | |
| 8,146,813 B2 | 4/2012 | King et al. | |
| 8,184,852 B2 | 5/2012 | Hofman et al. | |
| 2008/0154752 A1 * | 6/2008 | Zakula et al. | .................... 705/28 |
| 2008/0219827 A1 * | 9/2008 | Lanigan et al. | ............. 414/792.8 |
| 2008/0309487 A1 | 12/2008 | Chao | |

(Continued)

FOREIGN PATENT DOCUMENTS

| | | | |
|---|---|---|---|
| WO | WO2009075569 | 6/2009 | |
| WO | WO 2009075569 A1 * | 6/2009 | .............. B66C 19/00 |

OTHER PUBLICATIONS

International Search Report and Written Opinion dated Apr. 30, 2014, International Application No. PCT/US14/21032 (9 pages).

*Primary Examiner* — Ig T An

(74) *Attorney, Agent, or Firm* — McCracken & Gillen LLC

(57) ABSTRACT

A dynamic inventory tracking and transfer system is provided that, when in operation, keeps track of inventory by tracking vehicle positions and inventory transfers. A transceiver on a vehicle detects and transmits a signal to the tracking system whenever a vehicle latches onto inventory and/or releases (i.e., unlatches) inventory. Whenever latch and unlatch signals are detected close in proximity to one another, the system concludes an inventory transfer has been made between the two vehicles. The inventory monitoring takes place in real time, thereby allowing inventory to be tracked from the time it is removed from a ship/train to the time it leaves a sea port, rail terminal or industrial yard.

19 Claims, 11 Drawing Sheets

(56) References Cited

U.S. PATENT DOCUMENTS

| | | |
|---|---|---|
| 2009/0072554 A1 | 3/2009 | Arguin |
| 2010/0089855 A1* | 4/2010 | Kjolseth ................. 212/276 |
| 2010/0097208 A1* | 4/2010 | Rosing et al. ............ 340/539.13 |
| 2011/0017693 A1* | 1/2011 | Thomas et al. ............... 212/270 |
| 2011/0027059 A1 | 2/2011 | Benedict et al. |
| 2011/0052001 A1 | 3/2011 | Tan et al. |
| 2011/0280448 A1 | 11/2011 | Hofman et al. |
| 2012/0089320 A1 | 4/2012 | Tan et al. |

* cited by examiner

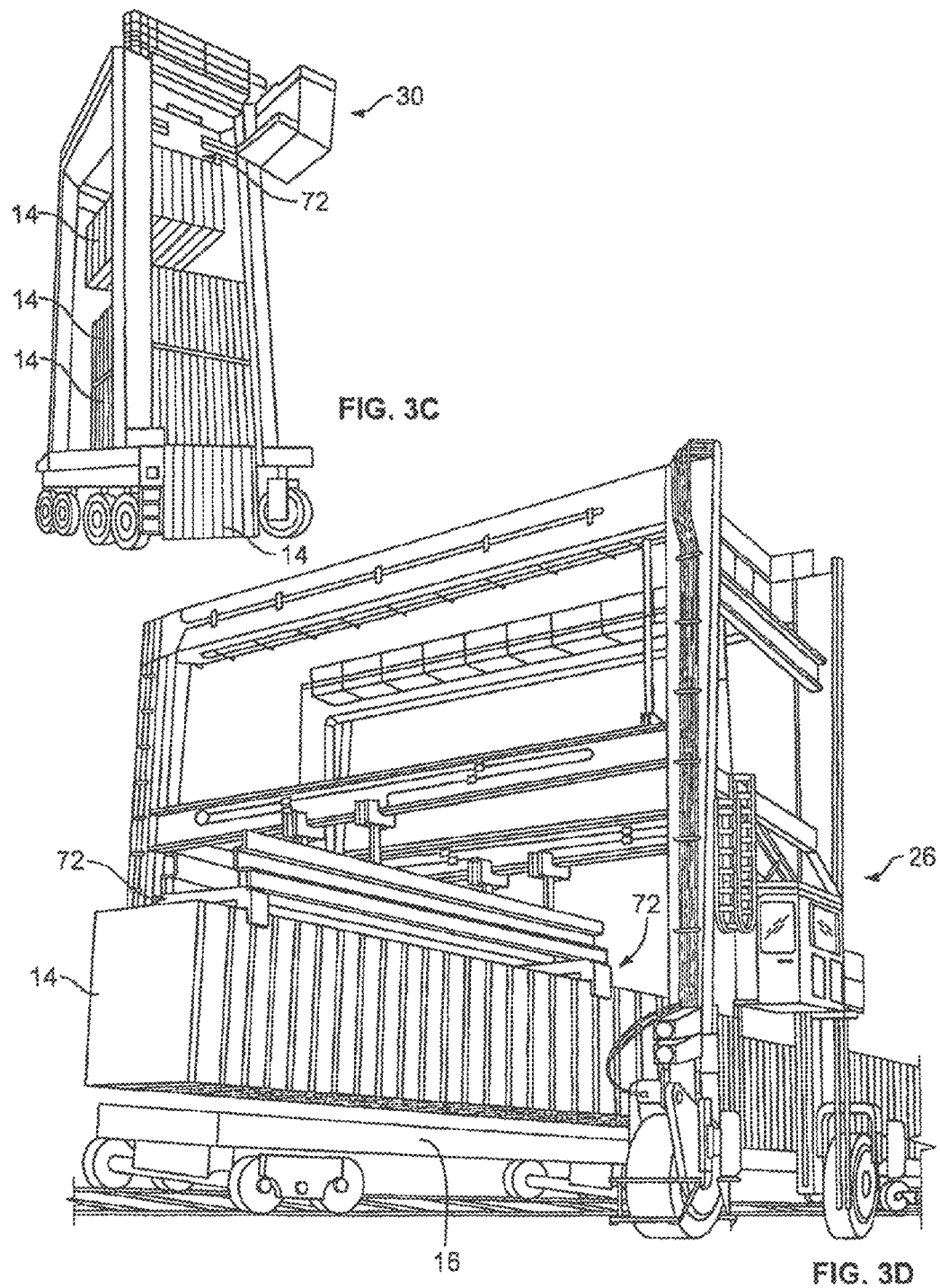

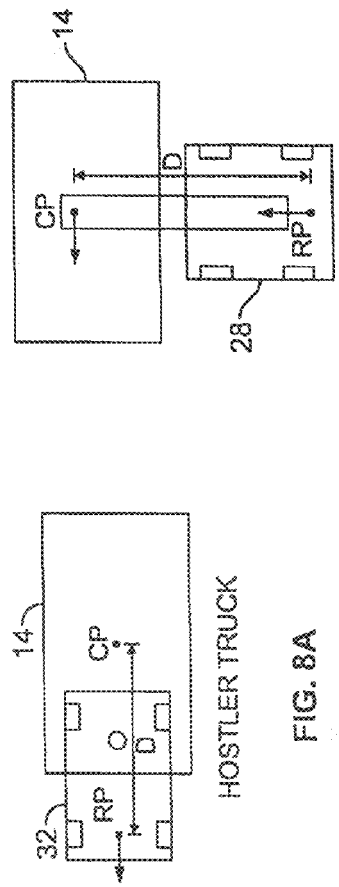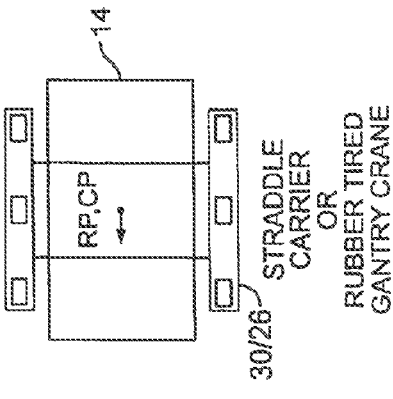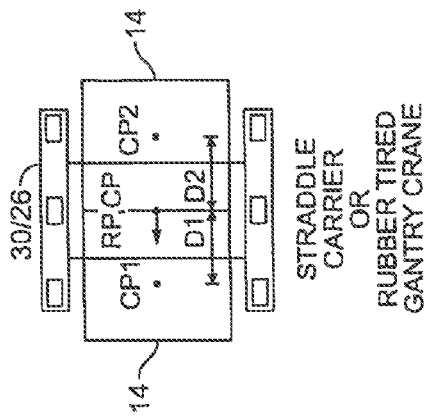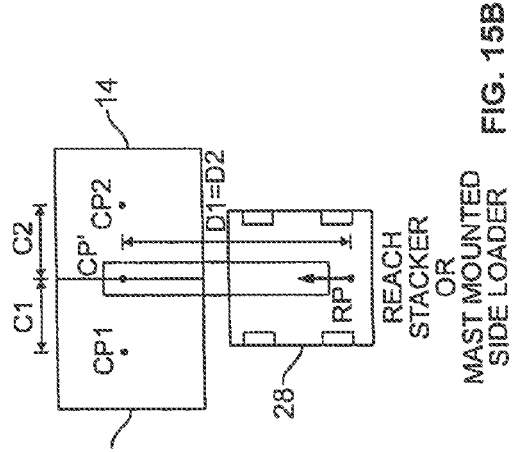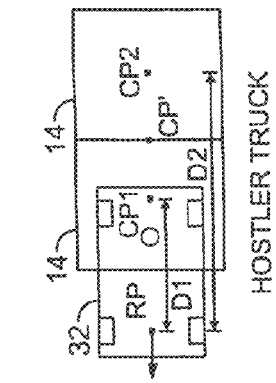

$$\begin{pmatrix} X \\ Y \end{pmatrix}_{CP} = \begin{pmatrix} \cos(\alpha) & -\sin(\alpha) \\ \sin(\alpha) & \cos(\alpha) \end{pmatrix} \begin{pmatrix} 0 \\ D \end{pmatrix} + \begin{pmatrix} X \\ Y \end{pmatrix}_{RP}$$

FIG. 9

| Rejection Tests |
|---|
| The container states are not compatible ($t_0 = 2^{23}$) |
| The container separation along the width axis is larger than a tolerance ($t_1 = 2^{24}$) |
| The container separation along the length axis is larger than a tolerance ($t_2 = 2^{25}$) |
| The container orientation (i.e. azimuth) difference is greater than a tolerance ($t_3 = 2^{26}$) |
| Speed for container 1 vehicle is greater than tolerance ($t_4 = 2^{27}$) |
| Speed for container 2 vehicle is greater than tolerance ($t_5 = 2^{28}$) |
| Container lengths are different ($t_6 = 2^{29}$). Note: this is only applied if both lengths are known (i.e. non-zero). |
| Vehicle types are incompatible (see example vehicle compatibility matrix in FIG. 12) ($t_7 = 2^{30}$) |
| Score threshold test failed tolerances ($t_8 = 2^{31}$), where a looser threshold is applied for quickly rejecting poor matches, resulting in faster matching times |

FIG. 10

| VEHICLE TYPE CODES ||| 
|---|---|---|
| Name | Num. | Description |
| DOCK | 0 | After a container is lifted from the ship it is placed on the ground or in a trailer in the dock area under the crane (but not being moved by a vehicle). |
| TEMP | 1 | Container sitting in a trailer waiting sitting in temporary area, waiting to be picked up by a hostler truck. |
| PERM | 2 | A container that is stacked in the permanent storage area. |
| RTG | 3 | rubber tired gantry crane |
| STRAD | 4 | straddle carrier |
| TRUCK | 5 | Hostler truck that tows a trailer to carry containers within the yard |
| REACH | 6 | Reach stacker and/or mast mounted side loader that lifts and moves containers from the side |
| STOSCR | 7 | ship to shore crane |
| RAILCR | 8 | rail mounted gantry crane |

FIG. 11

| VEHICLE COMPATIBILITY MATRIX (Dark fields indicate '1', white '0') |||||||||| 
|---|---|---|---|---|---|---|---|---|---|
| Name | DOCK | TEMP | PERM | RTG | STRAD | TRUCK | REACH | STOSCR | RAILCR |
| DOCK | | | | | | | | | |
| TEMP | | | | | | | | | |
| PERM | | | | | | | | | |
| RTG | | | | | | | | | |
| STRAD | | | | | | | | | |
| TRUCK | | | | | | | | | |
| REACH | | | | | | | | | |
| STOSCR | | | | | | | | | |
| RAILCR | | | | | | | | | |

FIG. 12

| CONTAINER AVAILABILITY STATES | | | | | | |
|---|---|---|---|---|---|---|
| Name | Num | Description | AVAIL | FULL | BOTH | UNAVAIL |
| AVAIL | 0 | LCL is accepting | | | | |
| FULL | 1 | LCL is providing | | | | |
| BOTH | 2 | Can accept or provide or if state not known | | | | |
| UNAVAIL | 3 | LCL cannot accept or provide | | | | |

FIG. 13

$$\begin{pmatrix} \delta_1 \\ \delta_2 \end{pmatrix} = \begin{pmatrix} \cos(\alpha) & \sin(\alpha) \\ -\sin(\alpha) & \cos(\alpha) \end{pmatrix} \begin{pmatrix} X_1 - X_2 \\ Y_1 - Y_2 \end{pmatrix}$$

FIG. 14

$$\begin{pmatrix} X \\ Y \end{pmatrix}_{CP(1,2)} = \begin{pmatrix} \cos(\alpha) & -\sin(\alpha) \\ \sin(\alpha) & \cos(\alpha) \end{pmatrix} \begin{pmatrix} C_{1,2} \\ D_{1,2} \end{pmatrix} + \begin{pmatrix} X \\ Y \end{pmatrix}_{RP}$$

FIG. 16

DYNAMIC INVENTORY TRACKING AND TRANSFER SYSTEM

BACKGROUND OF THE INVENTION

1. Field of the Invention

The present invention relates to the tracking of inventory items including, but not limited to, shipping containers (such as those used in rail and marine terminals), steel coils, steel slabs, concrete slabs, and other such items used in industrial applications. More particularly, the present invention relates to the tracking of inventory in a rail or ship yard using navigation systems and computer software.

2. Description of the Background of the Invention

The tracking of inventory while in transit is critical to many industries, businesses, and organizations. A single freight container may have over a million dollars worth of goods stored therein. If inventory is misplaced, lost, or delivered to the wrong location, it can result in significant lost value and cost expenditure for the shipper. With such significant economic exposure at risk, the tracking of inventory is considered a vital part of the railroad and shipping industry.

Numerous attempts have been made at tracking inventory within a railroad, shipping terminal, or industrial yard. Some of these attempts have used RFID tags, and barcodes. However, these systems may be prone to error if, for instance, dirt or grime obscures the scannable information. Additionally, these systems require RFID tags, and barcode information to be added to each piece of inventory or inventory container. Further, these tracking systems typically do not contemplate tracking the transfer of inventory between vehicles.

U.S. Pat. Nos. 8,055,554 and 7,344,037 ("the Zakula '554 and '037 patents") disclose a system that tracks a container's location while the container is traveling on a vehicle and when it is put into a storage location. The system disclosed in the Zakula '554 and '037 patents uses GPS, encoders, and latching signal data in conjunction with database information and computer logic to accomplish the task of tracking containers. The system disclosed in the Zakula '554 and '037 patents does not, however, contemplate determining and tracking the transfer of a container from one vehicle to another. There also does not appear to be any disclosure in either of the patents of the use of an inertial navigation system in conjunction with the tracking of the containers.

U.S. Pat. No. 7,916,026 (Johnson) discloses a system that tracks containers and vehicles within a terminal. The system uses specially designed "tags" to accomplish its tracking. The system may also be integrated with GPS. However, the system requires that the tags and/or GPS be mounted on a container in order to track the container.

U.S. Published Patent Application No. 2011/0052001 (Tan et al.) discloses a method for automatically detecting and handling errors in an inventory tracking system. The inventory tracking system uses ID Readers implemented through RFID, bar codes, and/or OCR to detect and ID containers and vehicles. Alternatively, identification data associated with an individual container may be provided by a terminal operating system. However, the Tan et al. publication focuses on error detection, and does not disclose the tracking of container transfers between vehicles. Additionally, while the equipment used in its inventory tracking system is disclosed, the Tan et al. publication does not disclose how its inventory tracking system is implemented.

U.S. Published Patent Application No. 2011/0017693 (Thomas et al.) discloses a system for tracking and locating shipping containers on a rail car in order to enable a gantry crane to locate a particular container more quickly. However, the system requires the use of cameras. Further, the Thomas publication does not contemplate tracking container handling vehicles or tracking container transfers between vehicles.

SUMMARY OF THE INVENTION

Disclosed is a method that uses a navigation system (including, for instance, satellite positioning and/or inertial navigation) and a computer system to track inventory (such as, for example, shipping containers (such as those used in rail and marine terminals), steel coils, steel slabs, concrete slabs, and other items used in industrial applications) as well as the vehicles used to carry inventory, in a sea port, rail terminal or industrial yard. An apparatus and system used to perform the method are also disclosed. For simplicity sake, the following disclosure will focus on tracking inventory stored in freight containers, with the understanding that the method may be applied in a similar fashion to other inventory and inventory tracking applications.

Each vehicle in the terminal that is capable of carrying inventory is equipped with a global positioning system (GPS) and an inertial navigation system (INS). The GPS and INS continuously transmit vehicle position and orientation data to the tracking and transfer system. The GPS and INS together form the Navigation System. GPS provides the primary means of position and orientation tracking. INS serves as a backup for situations where GPS is unavailable or imprecise, such as in inclement weather, or travel beneath an underpass, ship-to-shore crane, or other structures blocking receipt of the GPS signals.

When in operation, a tracking system keeps track of inventory location by tracking vehicle positions and vehicle transfers. A transceiver on a vehicle detects and transmits a signal to the tracking system whenever a vehicle latches onto, for instance, a container and/or releases (i.e., unlatches) a container. Whenever a latch or unlatch signal is detected, the system concludes a vehicle transfer has been made. Initially, a vehicle (typically a crane) initiates the process by picking a container up off of a dock (ground), a trailer or bombcart, or a ship or train. The tracking and transfer system then monitors where the vehicle moves and to what other vehicle the container is transferred. If, for example, a crane picks up a container and deposits the container on a truck, the system will detect that the truck is in proximity to the crane through satellite and/or inertial positioning of the crane and truck, and will detect unlatching and latching signals from the crane and truck, respectively. Thus, the system will conclude the container has been transferred to the truck and will monitor the truck to determine the location to which the container is transferred. All of this monitoring of the transfer and tracking of the container takes place in real time, thereby allowing a container to be tracked from the time it is removed from a ship/train to the time it leaves a port/rail terminal. This same process can apply to non-container applications such as, for example, steel or concrete facilities.

Other aspects and advantages of the present invention will become apparent upon consideration of the following detailed description.

BRIEF DESCRIPTION OF THE DRAWINGS

FIG. 3C is a straddle carrier latched onto a container above a container stack;

FIG. 3D is a rubber tired gantry crane latched onto a container above a train car;

FIG. 8A is a diagram showing the relationship between variable values RP (reference point), CP (center position), and D (distance between center points) with respect to a single 40 foot container carried by a hostler or traditional truck cab;

FIG. 8B is a diagram showing the relationship between variable values RP, CP, and D with respect to a single 40 foot container carried by a reach stacker or mast mounted side loader;

FIG. 8C is a diagram showing the relationship between variable values RP, CP, and D with respect to a single 40 foot container carried by a straddle carrier or rubber tired gantry crane;

FIG. 9 is an equation for converting RP to CP with respect to single 40 foot containers;

FIG. 10 is a sample list of rejection tests that may be used by a container tracking program;

FIG. 11 is an example list of vehicle/carrying type codes that may be used by a container tracking program;

FIG. 12 is an example vehicle compatibility matrix that may be used by a container tracking program;

FIG. 13 is a sample list of container availability states that may be used by a container tracking program;

FIG. 14 an equation for calculating the position separation along a width axis and length axis with respect to a modified z score that may be used by a container tracking program;

FIG. 15A is a diagram showing the relationship between variable values RP, CP, and D with respect to twin 20 foot containers carried by a hostler or traditional truck cab;

FIG. 15B is a diagram showing the relationship between variable values RP, CP, and D with respect to twin 20 foot containers carried by a reach stacker or mast mounted side loader;

FIG. 15C is a diagram showing the relationship between variable values RP, CP, and D with respect to twin 20 foot containers carried by a straddle carrier or rubber tired gantry crane;

FIG. 16 is an equation for converting RP to CP with respect to two 20 foot containers;

DETAILED DESCRIPTION

Figure 1:
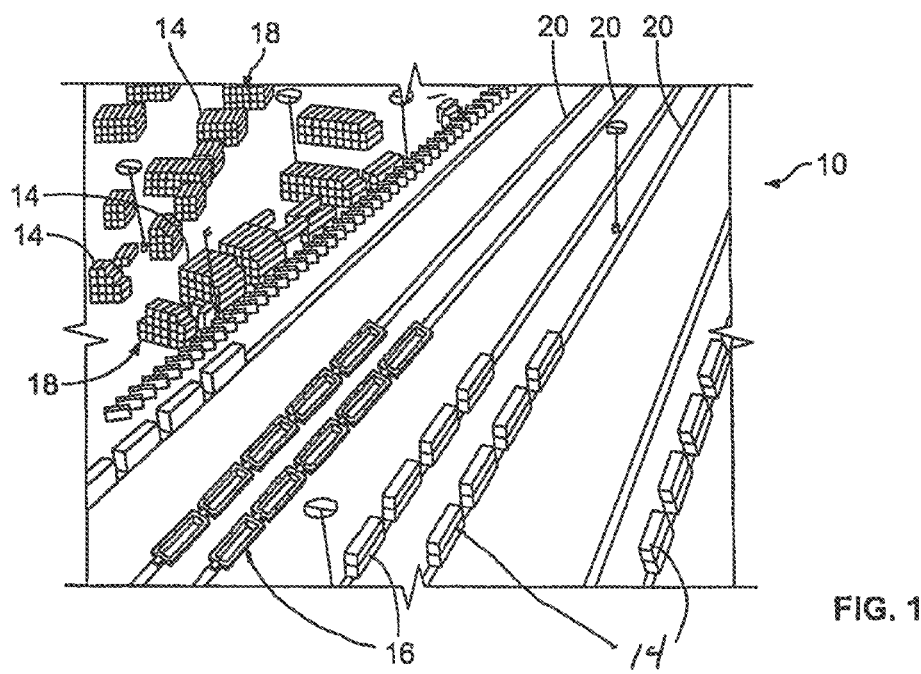
FIG. 1 is an isometric view of a typical railroad terminal.
Figure 2:
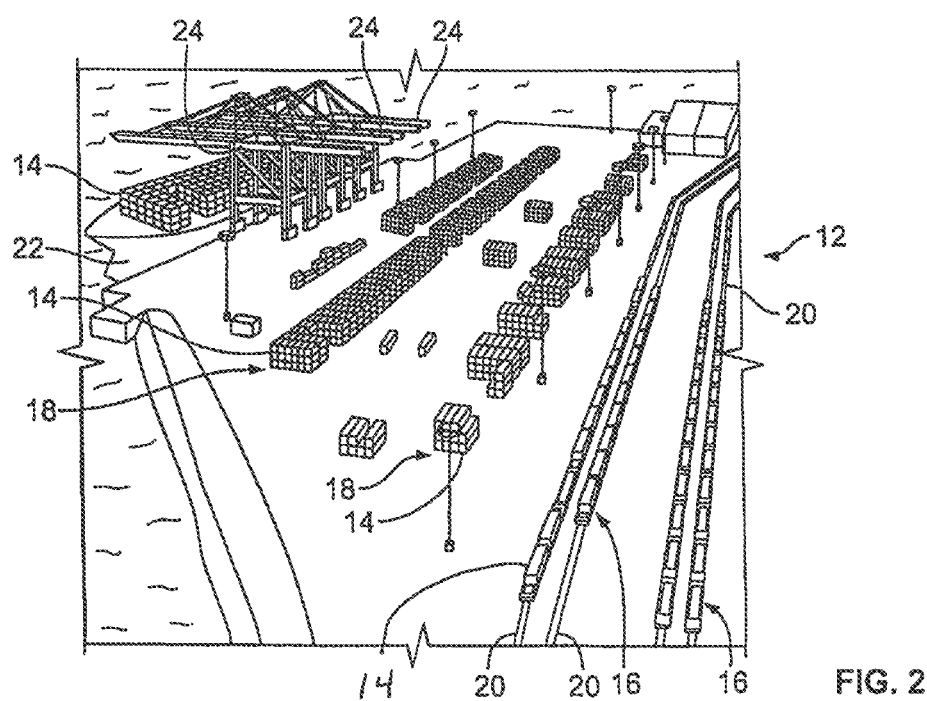
FIG. 2 is an isometric view of a combined seaport and railroad terminal.

Disclosed is a method for tracking inventory in a terminal such as a rail yard 10, as shown in FIG. 1, or a ship port 12, as shown in FIG. 2, or an industrial yard. For simplicity sake, the following disclosure will focus on tracking inventory stored in freight containers 14, with the understanding that the method may be applied in a similar fashion to other inventory and inventory tracking applications.

Turning to FIG. 1, a rail yard 10 is shown where, for example, the disclosed method might be implemented. The rail yard 10 includes train cars 16 that are empty and train cars 16 that are carrying containers 14. Containers 14 that have been unloaded from a train or that are to be loaded onto a train are stored in temporary storage spaces 18 away from the train tracks 20.

The disclosed method might also be used in a combination sea and rail port terminal 10, 12, such as shown, for example, in FIG. 2. Like FIG. 1, the terminal in FIG. 2 includes empty train cars 16, loaded train cars 16, and storage spaces 18. FIG. 2 also includes a ship 22 stacked with containers 14. Ship-to-shore cranes 24 are disposed near the ship 22 to assist in unloading the containers 14 from the ship 22. The disclosed method might also be used in a standard seaport terminal 12 or industrial yard.

As used within this application, the term inventory carrying vehicle refers to vehicles used primarily in a terminal to carry, handle, and manipulate inventory and/or freight containers 14 that carry inventory. The term "inventory carrying vehicle" is intended to denote only that the vehicle is capable of carrying a container or other inventory item, not that the vehicle is necessarily carrying a container or inventory item at the present time.

Figure 3A:
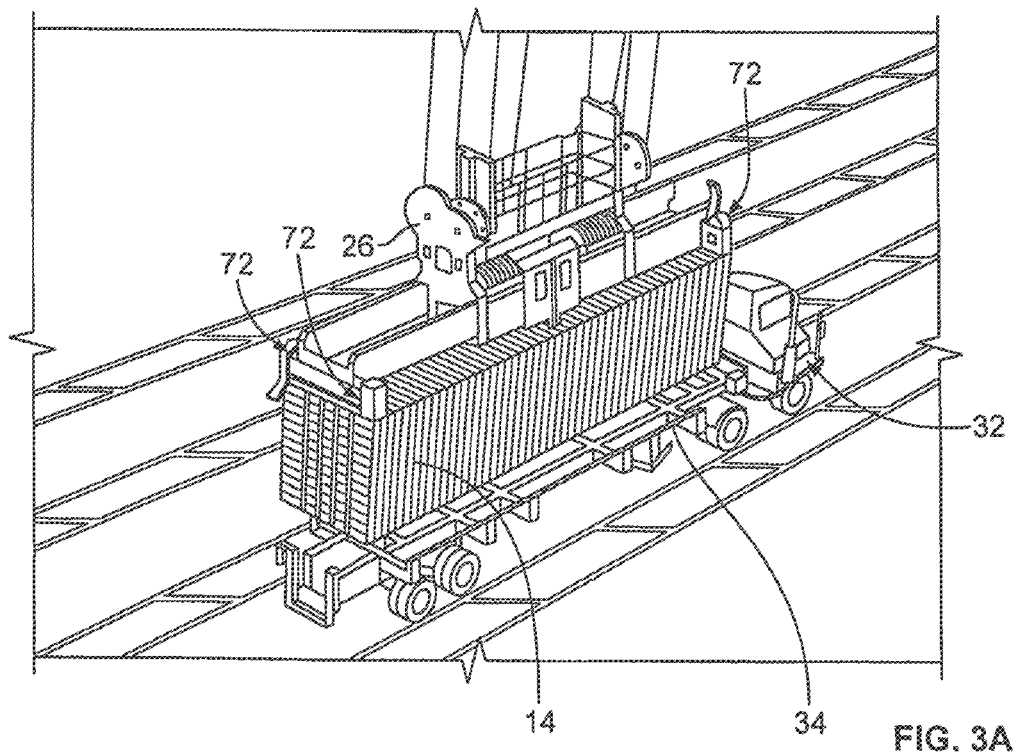
FIG. 3A is an isometric view of a container transfer between a crane and a hostler chassis.
Figure 3B:
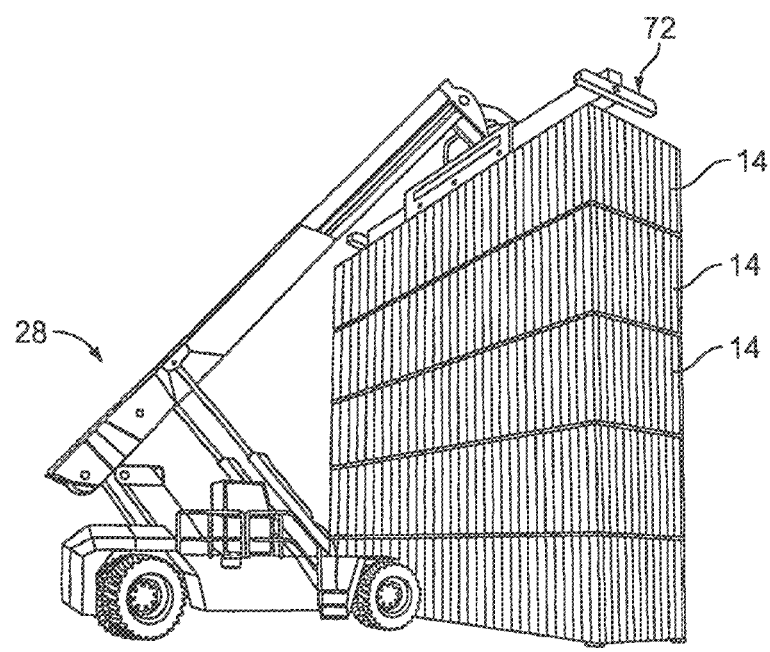
FIG. 3B is an isometric view of a side loading reach stacker positioned to latch onto a stacked container.

In one embodiment, an inventory carrying vehicle may include a rubber tired gantry crane (RTG) 26, as shown in FIG. 3D. Inventory carrying vehicles may also include reach stackers 28 (or a mast mounted side loader, which is similar), straddle carriers 30, ship-to-shore cranes 24, ships 22, trains 16, hostler 32 or conventional trucks combined with a trailer or bomb cart 34, and other similar equipment. FIG. 3B shows a reach stacker 28 positioned to latch onto a container 14 atop a stack of container 14. FIG. 3C depicts a straddle carrier 24 latched onto a container 14 atop a stack of containers 14. FIG. 3D shows a rubber tired gantry crane 12 latched onto a container 14 above a train car 16. The container 14 in FIG. 3D is larger than normal, so the corner castings 36 that the gantry crane 26 latches onto are positioned where the corners would be on a standard 40 foot container 14, rather than where the actual container corners of the larger container 14 so as to ensure compatibility with the inventory carrying vehicles. All the inventory carrying vehicles in FIGS. 3A-3D may have automatic latching and unlatching mechanisms and a vehicle operating system configured to send a signal whenever a latching or unlatching event occurs.

Figure 4A:
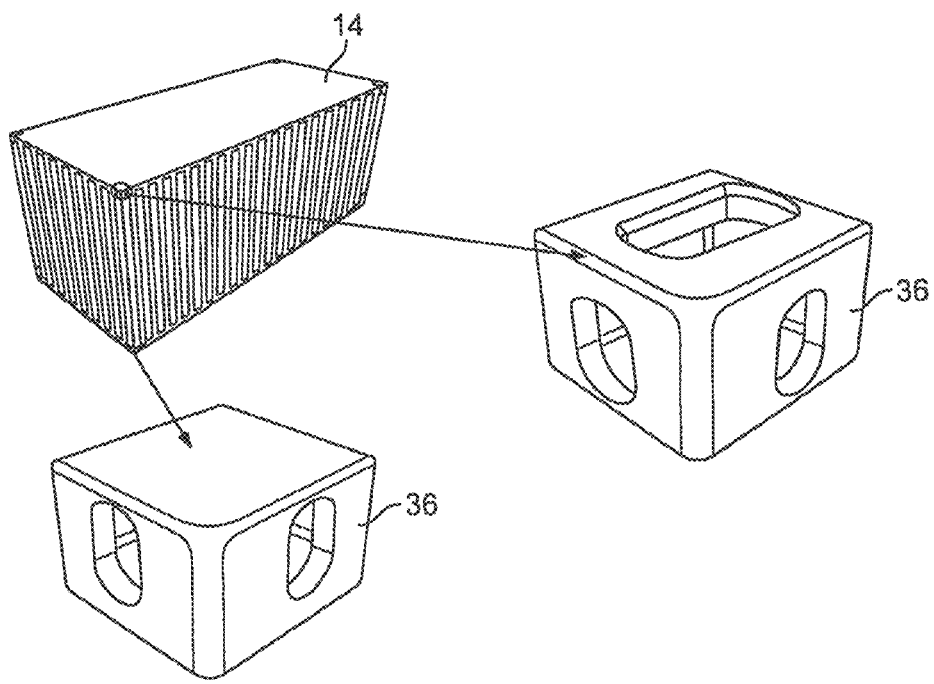
FIG. 4A depicts two typical corner castings and their placement on a standard size container.
Figure 4B:
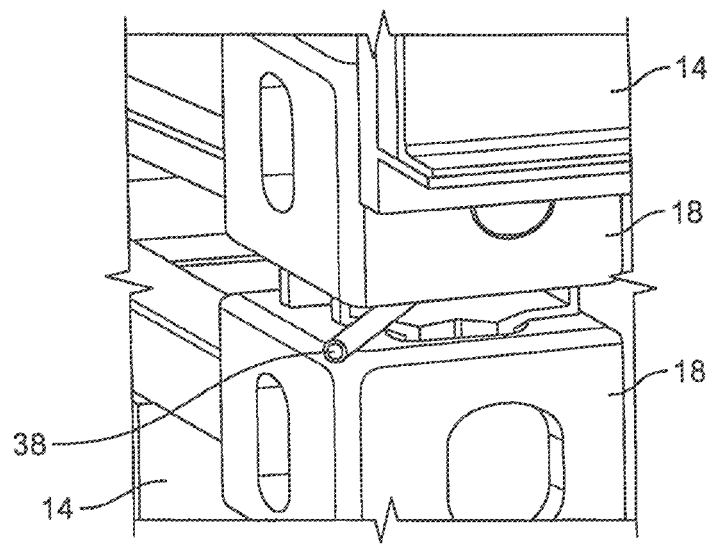
FIG. 4B shows a close up of the corner castings of two stacked containers locked together.
Figure 5A:
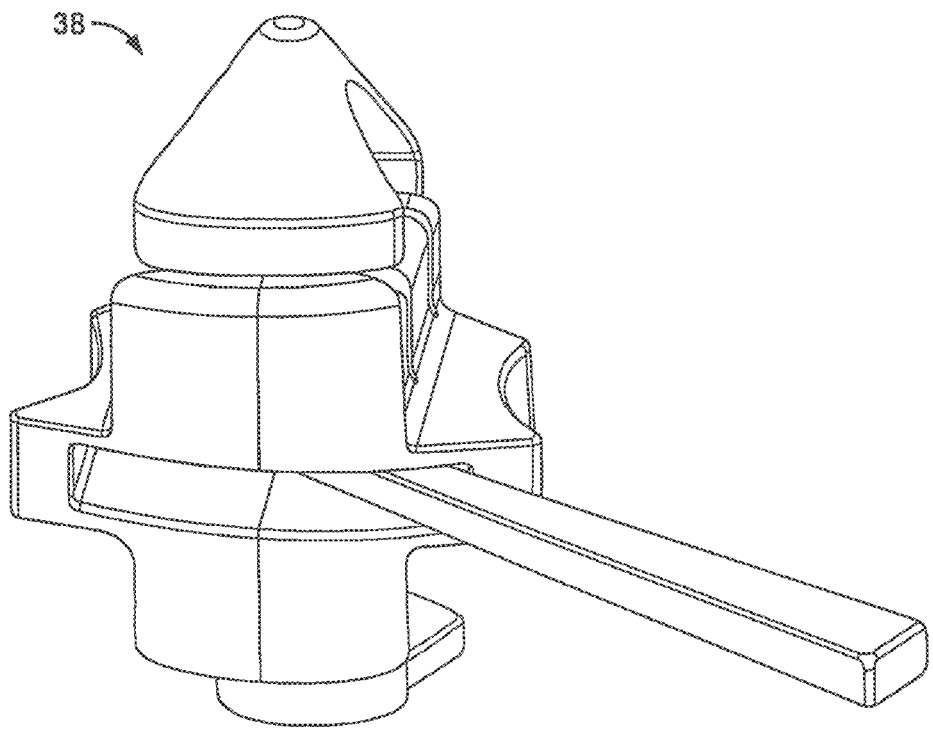
FIG. 5A shows a twist locking latch mechanism in an unlocked position.
Figure 5B:
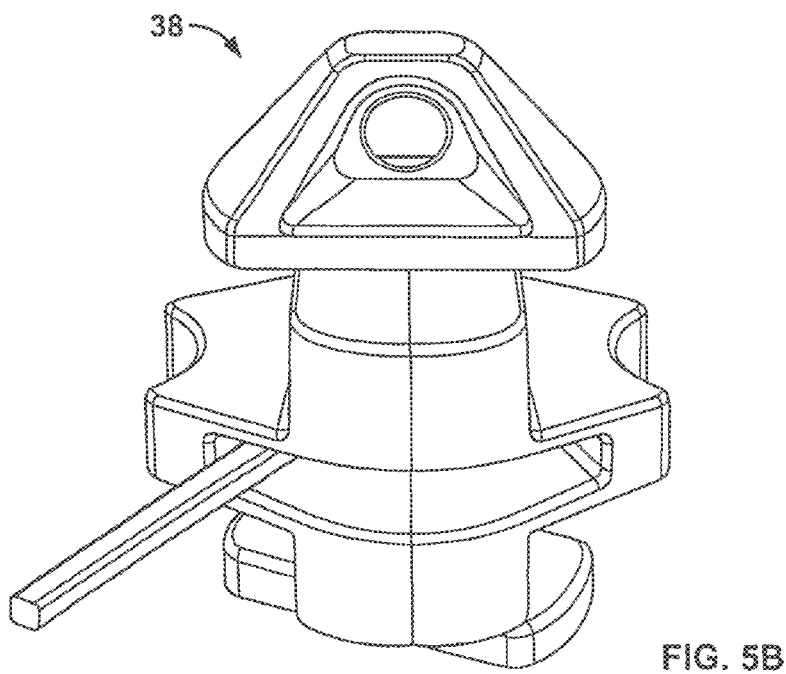
FIG. 5B shows a twist locking latch mechanism in a locked position.

A standard size container 14 typically has a corner casting 36 at four or eight of the container's corners. Some larger containers 14 have corner castings 36 positioned at the same distance from one another as they would be on a standard size container 14 as opposed to the actual corners of the larger container 14. This positioning allows for compatibility (see e.g., FIG. 3D) with inventory carrying vehicles. FIG. 4A depicts two typical corner castings 36 and their placement on a standard-size container 14. Each corner casting 36 is configured to receive a twist lock mechanism 38, such as shown in FIGS. 4B, 5A and 5B. While in an unlocked position, such as shown in FIG. 5A, the twist lock 38 can be inserted into and removed from a corner casting 36. While in a locked position, such as shown in FIG. 5B, the twist lock 38 cannot be inserted into or removed from a corner casting 36. The combination of the corner casting 36 and twist lock 38 can be used to latch containers 14 together when stacked, as shown in FIG. 4B, to prevent the upper container(s) 14 from falling off of the stack. In order to move an upper container 14 off of a stack of lower containers 14 the twist locks 38 must first be unlatched, typically by hand.

Inventory carrying vehicles latch onto the corner castings 36 of containers 14 to secure a container 14 to a vehicle while in motion. FIG. 3A depicts the spreader of crane 26 latched onto four corner castings 36 of a container 14 in order to secure the container 14 while in motion. In order to move a container 14 off of an inventory carrying vehicle, the container 14 must first be unlatched. Inventory carrying vehicles typically have automatic latching and unlatching mechanisms, such as spreader twistlocks 38, that an operator can activate from the cabin of the inventory carrying vehicle. The operating system of the inventory carrying vehicle is further configured to send a signal whenever a latching or unlatching event occurs. In FIG. 3A, the spreader of crane 26 will remain latched to the four corners of the container 14 to secure the container 14 to the crane 26 until the crane 26 sets the container 14 securely on the chassis or bomb cart 34. Once the crane 26 operator sees that the container 14 is positioned correctly, or a spotter tells the operator that the container 14 is positioned properly, the crane 26 operator may unlatch the spreader of crane 26 from the container 14. A hostler 32 driver may latch the container 14 to the chassis or bomb cart 34 using a twist lock 38 either before or after the crane 24, 26 unlatches from the container 14. Additionally, or alternatively, a hostler 32 may send a signal indicating a transfer or latching event when its fifth wheel is activated, which indicates the connection/disconnection of a container carrying trailer or bomb cart.

The tracking method is comprised of: (1) creating a plurality of digital records, wherein each record represents an inventory carrying vehicle and wherein each record includes position data representing a physical position of the vehicle; (2) updating a first position data of a first record corresponding to a first vehicle, wherein the first position data is updated with position data transmitted by and received from a first navigation system mounted on or carried in the first vehicle; (3) detecting a transfer signal sent from the first vehicle, and the location of the first vehicle, such signal reflecting that the first vehicle is no longer carrying a container; (4) detecting a transfer signal from a second vehicle and comparing a location of the second vehicle to the location of the first vehicle to determine if the container has been transferred such that the second vehicle is now carrying the container in place of the first vehicle; and (5) updating the data base to reflect the second vehicle is now carrying the container.

The disclosed technology may be used to track containers 14 when they are unloaded from a train or ship 22. Typically containers 14 are unloaded from a ship 22 using a ship-to-shore crane 24, as shown in FIG. 2. Containers 14 on a train are typically unloaded using a gantry crane 26, as shown in FIG. 3D. Once a container 14 is taken off of a train car 16 or ship 22 it may be transferred to a chassis or bomb cart 34 that is hauled by a hostler 32, or conventional truck cab, as shown, for example, in FIG. 3A. After a container 14 is loaded onto a chassis or bomb cart 34, the hostler 32 may haul it to a temporary storage space 18. Alternatively, the hostler 32 may haul the container 14 to another inventory carrying vehicle. Or, the hostler 32 may haul the container 14 to a train or ship 22 or conventional truck cab for loading and transporting from the yard. It is important to interested parties that the whereabouts of container 14 is tracked at all times, including during a vehicle transfers, so that a given container 14 with a given load gets to the correct destination.

The technology involves creating a plurality of digital records that each represents a physical position of each inventory carrying vehicle. This is done initially to account for all of the inventory carrying vehicles in a particular rail 10 or ship terminal 12. The records are created digitally, in computer memory, by a computer program and include geographical positions for all of the inventory carrying vehicles.

The disclosed technology uses equipment on an inventory carrying vehicle to obtain position data representing a physical position of the inventory carrying vehicle as well as any carried container(s). In one embodiment, the first navigation system may include a satellite positioning device such as a global positioning system (GPS), and/or an inertial navigation system (INS). GPS provides the primary means of position and orientation tracking. INS serves as a backup for situations where GPS is unavailable or imprecise, such as in inclement weather, or travel beneath an underpass or other overhead objects such as ship-to-shore cranes 24. The navigation system may further include a rover having a transceiver (or a separate transmitter and receiver), and guidance and control boards. In one embodiment, the rover may additionally include an antenna. There is at least one transceiver (or a separate transmitter and receiver) in each inventory carrying vehicle that is in communication with both the GPS and INS. The transceiver may also be in communication with the automatic latching and unlatching mechanisms and vehicle operating system. The transceiver(s) may be configured to continuously transmit vehicle position and orientation data from the GPS and INS to a computer system 40 responsible for tracking the containers 14 and the vehicles. Alternatively, the GPS and INS transceiver(s) may be configured to transmit vehicle position and orientation data only when queried, or according to some combination of continuous, periodic, and responsive transmissions. The GPS and INS position data is used in combination with latching signals sent by a vehicle operating system to determine which containers 14 are in close proximity to one another when a latching or unlatching event occurs, thereby permitting a computer system 40 to record a container 14 transfer in a database 42.

As an inventory carrying vehicle is moved, its position is updated in its digital record with position data transmitted by and received from a navigation system mounted or carried on the vehicle. When a container 14 is transferred from one vehicle to another in the yard, a signal may be sent from both the vehicle receiving the transferred container 14, and the vehicle releasing the transferred container 14. A signal is sent from an inventory carrying vehicle whenever a latch or unlatch event occurs. A latch event occurs when an inventory carrying vehicle latches onto a container 14. Likewise, an unlatch event occurs when an inventory carrying vehicle releases or unlatches from, for example, the corner castings 36 of a container 14. This signal is detected by a transceiver 44 and the digital record of both the receiving and transferring vehicle is updated. Once the latch is made and the location of the latch matches the unlatch location a signal is sent with the latch and location confirming the transfer of the container 14 is made between inventory carrying vehicles.

When the container 14 transfer is detected, the first position data of the first inventory carrying vehicle record is compared with the position data of the second inventory carrying vehicle records to determine the closest inventory carrying vehicle. If a first vehicle has a dynamic inventory unlatch event and a second vehicle has a latch event where the first vehicle dynamic inventory cell unlatch event occurred, then the system determines that an inventory transfer has occurred. Alternatively, if an unlatch event occurs and no latch event is detected (or vice versa), then the system may search for the closest vehicle that may be involved in a transfer. In either case, the first record is updated to reflect that the first inventory carrying vehicle is no longer carrying the container 14 while the record of the closest vehicle is updated to reflect that that vehicle is now carrying the container 14. This may be carried out digitally by a computer program.

Figure 6:
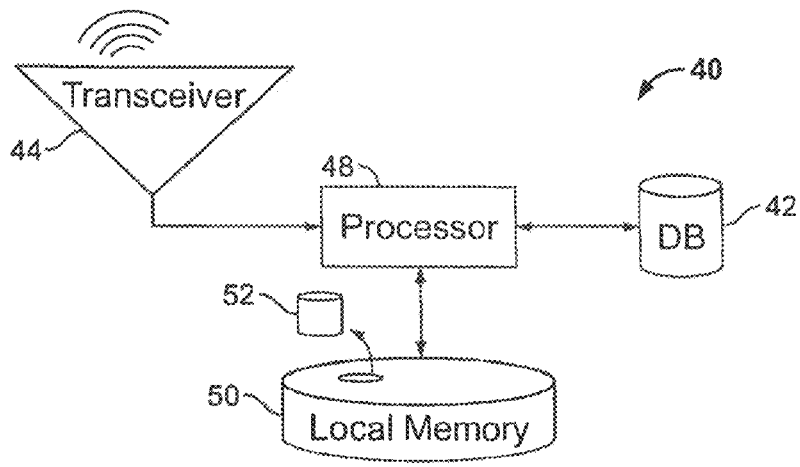
FIG. 6 is a diagram of a container tracking computer system.

At least a portion of the disclosed method may be implemented through the inventory tracking computer system 40. As depicted in FIG. 6, the inventory tracking computer system 40 consists of a digital processor 48 with local digital memory 50. The inventory tracking computer system 40 relies in part on information obtained and transmitted from each inventory carrying vehicle's operating system, as well as information obtained and transmitted from each vehicle's Global Positioning System/Inertial Navigation System. The processor 48 may be part of a desktop computer, computer server, laptop, mainframe, tablet, mobile device, or any other device with sufficient processing power. The processor 48 is configured to communicate with a database 42 that may be stored locally or remotely. A transceiver 44 is configured to communicate with the processor 48.

A container tracking program 52 may be used to create, update, and compare the plurality of digital records of the disclosed method. In one embodiment, the container tracking program 52 and digital records may be stored in local memory 50. Alternatively, the container tracking program 52 and digital records may be stored in remote and/or distributed memory, such as on a local server, a network server, an internet server, or some other suitable memory location. The container tracking program 52 may be written in any suitable programming language, as known by those of skill in the art. The programming language is preferably object oriented. In one embodiment, the programming language is C++ based. When executed, the program handles the processing of information and data necessary for tracking the container handling/carrying vehicles and corollary containers 14.

Figure 7:
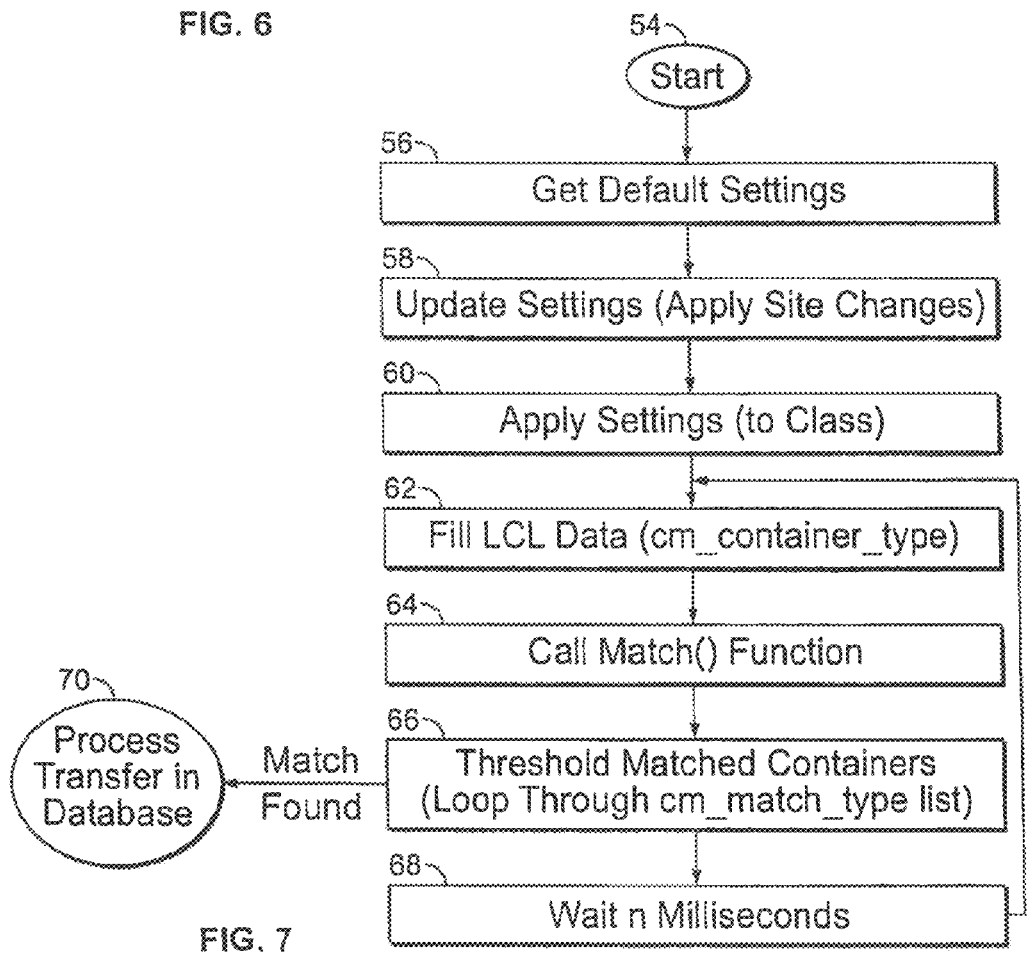
FIG. 7 is a flow diagram showing the steps that a container tracking program may undertake to detect and process container transfers between inventory carrying vehicles.

FIG. 7 shows the steps the program 52 undertakes to detect, determine, and process container 14 transfers between vehicles. Soon after the program 52 starts 54, there are a series of pre-processing steps 56-60. In the first step 56, the program 52 finds and loads default settings. The default settings may be loaded from local memory 50, from the database 42, from an associated terminal operating system (not shown), or from another source of digital memory such as a floppy disc, USB drive, CD, distributed memory (e.g., internet). Alternatively, the default settings may be entered manually by a user through an input device (not shown), such as a mouse and keyboard, touch screen, microphone and voice recognition module, or any other suitable device as known to those of skill in the art. The default settings may include a loop cycle wait value n for use in step 68, initial locations of certain inventory carrying vehicles and/or containers 14, and other such information used with respect to the container tracking program 52, as explained further below.

The settings may be updated in step 58. The settings may be updated by loading from memory as described above, an associated terminal operating system as described above, or by user input as described above. The settings are applied in step 60.

The disclosed method creates a plurality of digital records that include position data representing a physical position of the inventory carrying vehicle during the apply settings step 60 shown in FIG. 7. As part of the apply settings step 60, data used by the program 52 is created in memory using settings data. In particular, the program creates Container-Carrying Vehicle (CCV) records that hold information pertaining to: the X, Y position of a reference point (RP) of the vehicle in meters in the local terminal coordinate system, the X, Y standard deviations (SD) values that describe the estimated 1-sigma error associated with the RP position (meters), the covariance value indicating the correlation between X and Y errors (if they are not known, then 0.5*SDX*SDY can be used), the azimuth (AZ) of the vehicle's forward direction in degrees, the SD value corresponding to this azimuth (deg), and the speed in meters per second (m/s).

The program 52 also creates Logical Container Location (LCL) records that hold information pertaining to the location of a container 14 carried by a CCV. A logical container location (LCL) is a portion of space that may potentially provide, accept, or hold a container 14. Each LCL record may be created as part of a CCV record, or as a separate independent record. Alternatively, each CCV record may be created as part of a LCL record. Each LCL record holds information pertaining to: X,Y position of the container center point (CP) in meters (local yard system), SDX and SDY values corresponding to position accuracy (meters), azimuth of container length axis (degrees), SD value of azimuth (degrees), the covariance value indicating the correlation between X and Y errors (if they are not known, then 0.5*SDX*SDY can be used), vehicle type and/or status of the vehicle, container 14 size (i.e., length), which may be zero if it is not known, an availability state value indicating if the LCL is available, used or unavailable, and a unique reference number which can be used to look up further data about the container in the database. As part of the pre-processing stages 56-60, the vehicle based values RP must also be translated to the container center position (CP).

The reference point (RP) is a point on the vehicle where the local coordinate values are (0, 0). This point may be one of a GNSS or GPS antennae, vehicle origin, or single container 14 center. The latter case is typical of gantry cranes 26 and straddle carriers 30, while one of the former two would be more common for the reach stacker 28, mast mounted side loader, or hostler 32 (see e.g., FIG. 8). The container 14 center point (CP) is the center of the container 14 when the container 14 is latched to a CCV, and is required for many of the computations and determinations the tracking program 52 undertakes.

Using the equation shown in FIG. 9, the RP can be translated to the CP using the vehicle forward azimuth ($\alpha$) and the horizontal distance between the two center points (D), which is expressed in meters. For the reach stacker 28, D may be dependent on the arm length and elevation angle, while for the hostler 32 it depends on the location of the chassis or bomb cart 34 pivot and container 14 length. Information such as arm length, elevation angle, and chassis or bomb cart 34 pivot location may be hard coded, provided by a terminal operating system, and/or part of the data loaded and updated during get default settings step 56 and update settings step 58.

In addition to translating the position, the azimuth may also need to be altered for some vehicles. Specifically, the reach stacker 28 requires a 90° correction applied to the azimuth. Note that internally in this algorithm for a single container location it is not important if the container azimuth points to the side that opens (i.e., with the doors) or the closed side. It matters only that the container azimuth references the length axis. For dual containers (twin-twenties) azimuth direction cannot be disregarded, as discussed below.

The container tracking program 52 detects and processes container transfers between inventory carrying vehicles by continuously comparing the positions of LCL CP's, and continuously updating their positions using the CCV GPS and INS data in combination with the conversion algorithm discussed above. When a latch or unlatch signal is sent from a CCV to the transceiver 44, the tracking program 52 retrieves or is sent the signal, and then the program 52 determines which LCLs are near enough to each other to transfer a container 14. If no latch or unlatch signal is sent, then the program goes through another iteration of updating and comparing LCL positions. This process occurs continuously in a loop during steps 62-68. How often the continuous loop repeats may be determined by the data entered and/or loaded during the get default settings 56 and update settings 58 steps. However, the computation time can take longer with large numbers of LCLs, which will limit the repeat time. Typically, the continuous loop repeat time will be something on the order of 500 to 5,000 milliseconds. If a first CCV has a dynamic inventory unlatch event and a second CCV has a latch event where the first CCV dynamic inventory cell unlatch event occurred an inventory transfer has occurred.

The disclosed method updates the position data of the CCV and LCL records with position data transmitted by and received from navigation system mounted on or carried in each CCV during step 62 of FIG. 7. At step 62, the LCL records are populated with data corresponding to actual logical container locations in the rail yard 10 or ship yard 12. The records of the inventory carrying vehicles are also updated as a necessary part of this effort. During the first loop (e.g., when the program begins operation for the first time, such as at the start of the day or at initiation at a new rail yard 10 or ship yard 12 site), the records are populated with data for the first time. During subsequent loops, the information in each LCL and CCV record is updated. The position data of each CCV record is updated or first populated with position data received from the GPS and/or INS transceivers in or on each CCV. The position data may be sent in response to a signal that is sent through the computer system transceiver 44, or position data may be periodically sent by the CCV transceiver(s) without any prompting by the computer program 52, or both, as described above. The position data may be sent with additional information as well, such as to identify the CCV the position data corresponds to, or to facilitate other identification and processing. The computer system transceiver 44 receives the position data and the container tracking program 52 retrieves or is sent the information. Once obtained, the container tracking program 52 updates or first populates the appropriate CCV record with the position data. The position of the LCL(s) associated with a particular CCV can be calculated by the container tracking program 52 once the position of CCV is known.

The disclosed method may detect a container transfer signal, compare position data of different CCV/LCL records, and update the records to reflect a container transfer during steps 64, 66, and 70 of FIG. 7. At step 64, the LCL records are passed to a program subroutine that determines whether there have been any container transfers. In FIG. 7, the subroutine is entitled "Match( )." The LCL records may be passed to the Match( ) subroutine in an array, a list, a linked list, a hash table, a set, an object, a tree, a matrix, a graph or any other appropriate data structure that can hold a plurality of records known to those of skill in the art. The Match( ) subroutine takes the LCL records and compares the position data of each record with the position data of each other record to determine which ones may match. If the positions of two LCLs match, or come very close to matching, that indicates to the Match( ) subroutine that one or more container transfers may be taking place. If a latch or unlatch signal is detected by the transceiver 36 around the same time as the program 52 finds an LCL match, then the program 52 determines that a transfer has indeed taken place. If a first CCV has a dynamic inventory unlatch event and a second CCV has a latch event at the same or very similar location as the first CCV then the program 52 determines that an inventory transfer has occurred between the first and second vehicles.

In an embodiment, the matching process works by forming an N×N matrix (or graph), where each element contains a 32-bit integer score value for each possible record match. This score value is called the modified z-score and is described further below, but it can be said that a lower score indicates a more likely match. The score matrix has a unique property such that the upper diagonal and the lower diagonal are equivalent. Hence, if one wants to determine the likelihood of a match between two potential LCLs, then one need only look up the row and columns corresponding to the LCL index in the input list. The best possible match for a particular LCL would be the minimum modified z-score along the row or column, both being equivalent due to the matrix symmetry. By placing a threshold the modified z-score, the chance of a false match can be greatly diminished.

In the general form, a z-score is based on the equation: z=error/SD. SD refers to the standard deviation or sigma ($\sigma$) value. Hence, a value of 1.0 indicates a 1-sigma error. For this purpose, the general z-score may be modified to form a modified z-score (MZS). For example, in order to exploit faster integer processing, the floating z-score may be converted to a 32-bit unsigned integer by multiplying by 1,000. Hence, 1,000 would indicate a '1-sigma' error (or difference). The MZS is based primarily on the position difference, but it also has a component for the azimuth difference preventing a match between containers that are placed at different orientations. Very large values (e.g. values $\geq 2^{24}$) indicate a match has failed one or more of several rejection tests, some of which are shown in FIG. 10.

The MZS is computed using the formulation: $Z(i_1,i_2)$=INT $((w_1\delta_1/\sigma_1+w_2\delta_2/\sigma_2+w_3\delta_3/\sigma_3)/(w_1+w_2+w_3)\cdot 1000)+t_0+$ ... $+t_8$, where $i_1$ is the index to logical container 1, $i_2$ is the index to logical container 2, where $i_1 \neq i_2$, $w_1$ is the weight factor for width test (normally 1.0), $w_2$ is the weight factor for length test (normally 1.0), $w_3$ is the weight factor for azimuth test (normally 0.5), $\delta_1$ is the position separation between $i_1$ and $i_2$ along width axis (see FIG. 14), $\delta_2$ is the position separation between $i_1$ and $i_2$ along length axis (see FIG. 14), $\delta_3$ is the azimuth difference between $i_1$ and $i_2$ ($\alpha_1-\alpha_2$) in degrees, $\sigma_1$ is the combined SD value for width axis, $\sigma_2$ is the combined SD value for length axis, $\sigma_3$ is the combined SD value for azimuth difference, and $t_j$ is rejection test j, where $t_j=2^{23+j}$ on failure, or $t_j=0$ on pass. The SD values are calculated by the equations: $\sigma_1$=SQRT($SDW_1^2+SDW_2^2+(W/2)^2$); $\sigma_2$=SQRT($SDL_1^2+SDL_2^2+(L/2)^2$); and $\sigma_3$=SQRT($SDA_1^2+SDA_2^2+A^2$). SDA is the azimuth SD value for container 1 and 2, respectively, given in degrees. W is the container 14 width in meters. This value is important to prevent small SD values from corrupting the overall z-score value. L is the container 14 length in meters. If not known then 20' or 6.1 m is used. A is the azimuth constant value preventing small azimuth SD values from creating unnaturally large z-scores. This value is currently defined as 10.0 degrees.

The position differences are not expressed in X and Y but rather, they are rotated to the length and width axes of the container 14; the reason being that a false container 14 match is more likely along the width than the length axis. By working in a rotated coordinate system roughly aligned to the container 14, it is possible to utilize separate W and L values for desensitizing the axes independently. In order to compensate for the fact that the two containers 14 being compared have different orientations, an average azimuth value is used for the axis rotation, as given by the equation: $\alpha_{avg}=\alpha_1+\alpha_2$.

Special attention must be taken to account for azimuth values straddling the 180° mark, which is accounted for internally in the program 52. However, azimuth input must be restricted to the range −180° to 180°—as opposed to 0-360°, which will not work. Using this azimuth expressed in radians, the width and length differences are computed using the equation shown in FIG. 14. In the equation of FIG. 14, $\alpha$ is $\alpha_{avg}$, as described above, while $X_1, X_2, Y_1$ and $Y_2$ are the local Cartesian coordinates of the container 14 center point (CP).

SDW and SDL may be calculated via the equations: $SDW^2=\sigma_x^2\cdot\cos^2\alpha+2\cdot covxy\cdot\cos\alpha\cdot\sin\alpha+\sigma_y^2\cdot\sin^2\alpha$; and $SDL^2=\sigma_x^2\cdot\sin^2\alpha-2\cdot covxy\cdot\cos\alpha\cdot\sin\alpha+\sigma_y^2\cdot\cos^2\alpha$. SDW is the width axis standard deviation, while SDL is the standard deviation for the length axis. Covxy is the covariance or correlation value between the X and Y axes variances and ideally is a product of the navigation algorithms. If covxy is not available, then the following equation may be used as an approximation: $covxy=0.5\cdot\sigma_x\cdot\sigma$.

The SDW and SDL equations do not account for the additional error caused by shifting the RP position to CP, which should be less than 15 cm for most vehicle types. Handling this additional error is relatively easy mathematically but requires careful handling for each vehicle type. Furthermore, accounting for this additional error will have little effect on the MZS and the final matching reliability, which is why it has not been considered.

The Match( ) subroutine receives a plurality of LCL records as input, and outputs a list of potential container 14 matches. There will be one match record in the output list for each inputted LCL. Most, if not all, match record will not refer to a valid match at all. Hence, the program 52 must iterate or search through the list to locate matches in step 66. Alternatively, the program 52 may jump to one specific LCL record if the program 52 knows which LCL record is associated with a CCV that has sent a latch/unlatch signal. To determine if a particular match record corresponds to an LCL match, the program 52 may inspect a Boolean (i.e., true or false) variable in the match record. Alternatively, the variable may be a numerical, wherein the values TRUE and FALSE correspond to some numerical constant hardcoded, loaded, or inputted into to the program 52. To determine if a match is valid, the program 52 may inspect the MDZ value, which may be further threshold within a tolerance of 1,500 to 2,500. If the MDZ<tolerance, then the match is valid. Note that for each matched pair, both container match records may report a match. Some intelligence on behalf of the program 52 is additionally required to prevent double matches from being reported.

The disclosed method updates CCV and/or LCL records to reflect a container transfer in steps 66 and 70 of FIG. 7 if the program 52 finds a valid match through the match( ) and a latch or unlatch signal is received by the transceiver 44 close in time to the determination of a valid match. For each container 14 transfer between inventory carrying vehicles, the program 52 may signal a corollary system or program, such as a terminal operating system, that a new or different CCV is now carrying a particular container 14, so that the corollary system or program can track that CCV to determine the final resting location of the container 14. The transfer may also be recorded in the database 42 in step 70. Additionally, the CCV and LCL records of the program 52 may be updated to reflect the transfer. Once the program 52 has looped through the matched container results in step 66, and processed appropriate valid transfers in step 70, the program will wait n milliseconds in step 68 before beginning another loop iteration at step 62.

In order to prevent false matches between LCLs that cannot sensibly transfer between each other, each CCV and LCL record has a vehicle/carrying type code assigned, which is given in FIG. 11. In some cases, a container 14 that is not being carried or moved by a vehicle type, and the DOCK, TEMP or PERM codes would be used. An LCL being moved by certain vehicle types (or placed in the open) cannot be transferred to the same type or to those of certain other types. For instance, a side loading reach stacker 28 cannot receive from (or provide to) a straddle carrier 30, as this is physically impossible. To prevent such transfers, an M×M vehicle compatibility matrix is used, such that the value one permits a transfer (i.e., vehicles are compatible), while the value zero will prevent a container 14 match (i.e., vehicles are incompatible). An example of such an M×M vehicle compatibility matrix is shown in FIG. 12, where the dark fields indicate a '1', and the white fields indicate a '0'. This matrix is given by a variable in the settings structure that may be loaded and/or updated in get default settings 56 and update settings 58 steps. Additionally, the program 52 is configured such that the vehicle compatibility matrix may be changed after the get default settings 56 and update settings 60 steps to represent the actual on-site physical limitations or allowances using a SetVehicleCompatability( ) class member function.

In order to permit transferring from a ship-to-shore crane 24 to a hostler 32 or straddle carrier 30, the intermediary state DOCK may be used, as the configuration may not otherwise permit a direct transfer. All sites must share the same basic list of vehicle types for compatibility sake. However, each individual site may have its own transfer matrix and may use a sub-set of the vehicle types.

In addition to the vehicle carrying type, a state value is used to indicate if an LCL and/or CCV is available (i.e., receiving a container), full (i.e., providing a container), or both (possible in the permanent storage area, which is currently not deployed). In the present embodiment, the dynamic inventory tracking system does not support transfers to and from permanent storage areas as this is handled by the standard inventory tracking system and software. An LCL/CCV may also be identified as "Unavailable," which would be used if a machine is in a state where it can neither accept nor provide. This might happen, for example, if a twin-20 container 14 pair has had one container removed. The 20' LCL corresponding to the removed container would have this code. In a practical implementation, these LCLs need not be added to the list. FIG. 13 lists these states and their compatibility with the other states. In one embodiment of the program 52, the macros CM_STATE_TYPE are used to define the states, while a static 4×4 matrix shown in FIG. 13 is coded into the program 52 to realize the co-dependency between these states.

Until this point, the methods described herein have been concerned primarily with a single container 14 location. In actuality, many of the inventory carrying vehicles can handle two 20' containers 14, such that they are occupying the same volume of a standard 40' container 14. Hence, they are sitting side-by-side along the length access, as shown, for example, in FIG. 15. The calling software will need to handle twin-twenties in the following special ways:

When forming the LCLs, twin-twenties must be handled as separate container locations, meaning there should be two LCL entries. Also, the centre position (CP') of the 40' bounding container 14 will need to be shifted to each of the 20' container center points (CP1 and CP2), as shown by FIG. 15. This is discussed in more detail below.

After a twin-twenty has been transferred from the ship-to-shore crane 24 onto a chassis or bomb cart 34 and the chassis 34 has been picked up by a hostler 32, each of the 20' containers 14 could be removed in separate transactions at different locations. When one 20' container 14 is removed, its location does not have the AVAIL state (as per FIG. 13) and it should be changed to UNAVAIL until the second container 14 is removed. Alternately, the removed LCL could be removed from the list altogether.

The program 52 will need to keep track of each of the twin-twenties individually and must account for the one that is at the front, back, left or right side, depending on the vehicle type. Finally, if both containers 14 are transferred in tandem, two matches and transfer operations must be processed. Hence, there should be two valid record match pairs in the Match( ) output list.

In order to shift the vehicle RP to the twin center positions (CP1 and CP2), there are two approaches: one way is to compute the CP' for the 40' bounding container 14 using the equation of FIG. 9. This CP' is then translated again using the equation of FIG. 9, but with a 90° rotation applied to $\alpha$, while D would be +10' and –10' (converted to meters) respectively. Note that the RP position in FIG. 9 is really CP. Alternately, the equation of FIG. 16 can be used to apply the shift from RP to CP in one step, which is more attractive from a software development point of view, but requires very careful handling of each vehicle type, as illustrated in FIG. 15.

There will be separate C and D values in the equation of FIG. 16 for each of the twin container locations (CP1 and CP2), where the vehicle types shown in FIG. 15 would utilize the following values: Hostler 32: C1=C2=0, while D1 is offset to first container CP1 14 behind cab and D2 the offset to second container CP2 14, where CP2=D1+20'. $\alpha$ is the vehicle azimuth. Reach stacker 22: C1=–10' for left container CP1 14, C2=+10' for right container CP2 14, D1-D2 and is the same as before, while $\alpha$ is vehicle azimuth (perpendicular to container length axis). Straddle Carrier 24/Gantry Crane 12: C1=C2=0, D1=+10' for front container CP1 14, D2=–10' for back container CP2 14, while $\alpha$ is vehicle azimuth. Note that front refers to forward vehicle direction and not necessarily the traveling direction.

The method for computing "goodness of fit" for a container match is based on modified z-scores. However, this is not the only approach that could be used. One alternative could use container areas, where the area occupied by each container 14 forms a rectangular polygon. Container 14 transfers would be likely to occur if two of such polygons have a high degree of overlap, which can be computed via a polygon-to-polygon intersection algorithm. A match score could be overlap_area/container_area.

However, handling the position uncertainty is more complex in this approach. In the world of geographic information systems (GISs) spatial uncertainty is often not accounted for because polygons can be very large or intricate. In this situation, we have a simple rectangle and each of its four vertices has similar position SD values, which are in fact the same if azimuth error is ignored. Using either Monte Carlo method (Random Spatial Join), Mean Spatial Join or Probabilistic Spatial Join, the probability of two LCLs forming a match can be determined. Note that the Spatial Join operation is the filtering process that determines the shared polygon area (or none if there is no sharing possible).

Another approach could convert the bounding container 14 vector rectangle to a raster image, where the pixel value could fall off towards the edges, depending on the position uncertainty. An additive convolution could be used for a goodness of fit test.

Several alternative approaches have been proposed here, which are computationally and operationally more complex, but they could still constitute a practical and accurate method for determining if two LCLs are a match.

Also disclosed is a system for tracking a container 14. The system includes a plurality of inventory carrying vehicles, a receiver configured to receive transmissions from a transmitter, and a computer in communication with the receiver.

Figure 17A:
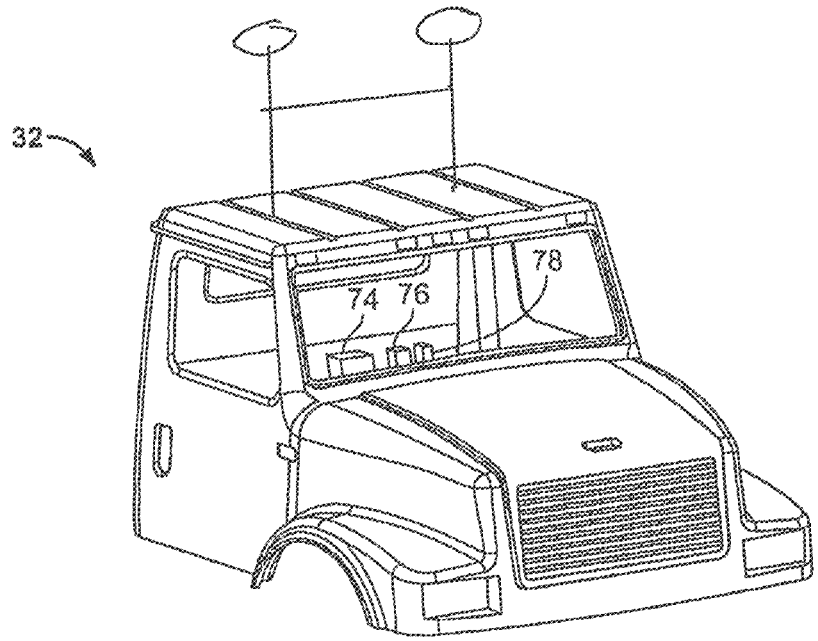
FIG. 17A is a truck cab with a navigation system 74 having a rover that includes a transmitter 76, receiver 78, guidance and control boards (not shown), and antennas (not shown) attached thereto.
Figure 17B:
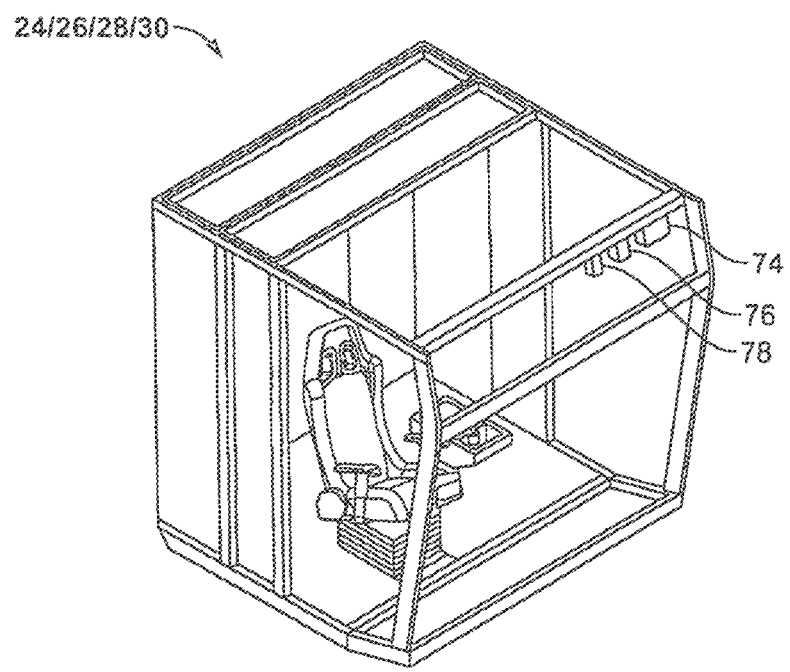
FIG. 17B is a crane cab with a navigation system 74 having a rover that includes a transmitter 76, receiver 78, guidance and control boards (not shown), and antennas (not shown) attached thereto.

As shown in FIGS. 17A and 17B, each inventory carrying vehicle includes a latching element 72 configured to latch onto and unlatch from a container 14, as well as a navigation system 74, and a transmitter 76. The navigation system 74 and transmitter 76 are in communication, and the transmitter 76 is configured to transmit position data generated by the navigation system 74. The transmitter 76 is further configured to transmit a signal when the latching element 72 latches onto a container 14 or unlatches from a container 14. The computer is configured to record in computer memory the position of the inventory carrying vehicles based on transmissions received by the receiver 78. The computer is further configured to determine the closest inventory carrying vehicle to an inventory carrying vehicle whose transmitter 66 transmits a latching or unlatching signal, and to record a container 14 transfer between the transmitting inventory carrying vehicle and the closest inventory carrying vehicle.

Disclosed too is a container tracking apparatus 40. As shown in FIG. 6, the apparatus 40 includes a transceiver 44 adapted to send and receive wireless signals, a memory 50 with computer executable instructions stored therein, and a processor 48. Execution of the computer executable instructions by the processor 48 causes the processor 48 to create a plurality of digital records, wherein each record includes position data representing a physical position of the inventory carrying vehicle. The processor 48 also updates a first position data of a first record corresponding to a first inventory carrying vehicle, wherein the first position data is updated with position data transmitted by and received from a first navigation system 74 mounted on or carried in the first inventory carrying vehicle. The processor 48 may further detect a container transfer signal sent from the first inventory carrying vehicle, compare the first position data of the first record with the position data of the plurality of records to determine a closest inventory carrying vehicle, update the first record to reflect that the first inventory carrying vehicle is no longer carrying a container 14, and update a record of the closest inventory carrying vehicle to reflect that the closest inventory carrying vehicle is now carrying the container 14.

Also disclosed is a software system for tracking freight containers 14. The software system includes a computer readable medium and a routine stored in the computer readable medium. The routine includes a first routine that creates a plurality of digital records, wherein each record includes position data representing a physical position of the inventory carrying vehicle. The routine further includes a second routine that updates a first position data of a first record corresponding to a first inventory carrying vehicle, wherein the first position data is updated with position data transmitted by and received from a first navigation system mounted on or carried in the first inventory carrying vehicle. The routine additionally includes a third routine that detects a container transfer signal sent from the first inventory carrying vehicle, compares the first position data of the first record with the position data of the plurality of records to determine a closest inventory carrying vehicle, updates the first record to reflect that the first inventory carrying vehicle is no longer carrying a container 14, and updates a record of the closest inventory carrying vehicle to reflect that the closest inventory carrying vehicle is now carrying the container 14. A trailer or bomb cart dropped off for a later transfer will have its position determined when the fifth wheel is activated.

INDUSTRIAL APPLICABILITY

Numerous modifications to the present invention will be apparent to those skilled in the art in view of the foregoing description.

For example a yard tractor could haul multiple trailers of steel coils. The yard tractor would be equipped with GPS/INS systems enabling it to locate trailers with a position and direction including the inside of a building. The yard tractor could position the empty trailers inside a coil mill. An overhead crane could load the trailers with specific coils into specific trailer cells utilizing encoders installed in the crane and coordinating with the position and direction of the trailers established with the tractor's GPS/INS systems. The coil identification and position (dynamic cell) would be entered into the dynamic cell inventory system.

The tractor can then haul the trailers out of the coil mill and into the facilities external inventory. The trailers would then be unloaded with coil carrying vehicles. The coil carrying vehicles would be equipped with GPS/INS. The specific dynamic cell being unloaded would be coordinated between the cells location established by the intersection of the coordinates and direction provided by the tractor GPS/INS and the coil carrying vehicle coordinates and direction provided by its GPS/INS. The coil would then be carried to its storage location and the transaction would be loaded into the inventory system with the location as provided by the coil carrying vehicles GPG/INS systems, or further transfer by the coil carrying vehicle and located by the vehicle GPS/INS.

This same methodology can be applied to other applications by someone skilled in the art.

Accordingly, this description is to be construed as illustrative only and is presented for the purpose of enabling those skilled in the art to make and use the invention and to teach the best mode of carrying out same. The exclusive rights to all modifications which come within the scope of the appended claims are reserved. All patents, patent applications, and other printed publications identified in this foregoing are incorporated by reference in their entireties herein.

What is claimed is:

1. A method of tracking inventory transferred within a freight yard, comprising the steps of:
   creating a plurality of digital records, wherein each record includes position data representing a physical position of a vehicle;
   updating a first position data of a first record corresponding to a first vehicle, within the freight yard, wherein the first vehicle is carrying inventory, and wherein the first position data is updated with position data transmitted by and received from a first navigation system attached to the first vehicle;
   unsecuring the inventory from the first vehicle whereby a signal that an unlatch event has occurred is sent by the first navigation system;
   securing the inventory to a second vehicle within the freight yard, said second vehicle having a second navigation system attached thereto, whereby a latch event signal is sent from the second navigation system;
   detecting the latch and unlatch event signals sent from the, respective, first and second navigation systems and determining the proximity of the first vehicle that sent the unlatch event signal relative to the second vehicle that sent the latch event signal;
   comparing the first position data of the first record with the position data of the plurality of digital records to determine if the second vehicle is a closest vehicle that had a latch event, and if the second vehicle associated with the sent latch event signal is determined to be the closest vehicle to the first vehicle associated with the unlatch event signal, the inventory carried by the first vehicle is determined to be transferred from the first vehicle to the second vehicle;
   updating the first record to reflect that the first vehicle is no longer carrying the inventory; and
   updating a record of the second vehicle to reflect that the second vehicle is now carrying the inventory.

2. The method of claim 1, wherein each vehicle is one of a rubber tired gantry crane, straddle carrier, hostler, mast mounted side loader, ship-to-shore crane, reach stacker, or the like and wherein a vehicle type is assigned for each vehicle and a computer is configured to determine if the vehicle type of the first vehicle is compatible or incompatible to transfer a container to the second vehicle.

3. The method of claim 1, wherein the first navigation system is a satellite positioning device or inertial navigation sensor and wherein the computer further determines that the inventory transfer between the first vehicle and the second vehicle occurred if a location of the transmitted unlatching signal matches a location of the transmitted latching signal.

4. The method of claim 1, wherein the step of securing the inventory occurs when a vehicle latches onto inventory or a fifth wheel of a truck is activated, and the step of unsecuring the inventory occurs when a vehicle releases inventory or when the fifth wheel of the truck is activated.

5. The method of claim 1, wherein the records are stored in computer memory.

6. The method of claim 1, wherein the inventory comprises a single twenty foot freight container.

7. The method of claim 1, wherein the inventory comprises two twenty foot freight containers.

8. A system for tracking inventory, comprising:
   a plurality of vehicles, wherein each vehicle includes a latching element and a navigation system,
   wherein the latching element is configured to latch onto inventory and unlatch from inventory,
   wherein the navigation system, including a transmitter, and the latching element are in communication with the transmitter,
   wherein the transmitter is configured to transmit position data generated by the navigation system, and wherein the transmitter is further configured to transmit an unlatching signal upon unsecurement of the inventory from a first vehicle that an unlatch event has occurred, and a latching signal upon securement of the inventory to a second vehicle within a freight yard, said second vehicle having a navigation system attached thereto, whereby the latching signal is sent from the transmitter of the navigation system of the second vehicle;
   a receiver configured to receive transmissions from the transmitters; and
   a computer in communication with the receiver, wherein the computer is configured to record in a computer memory the position of the vehicles based on transmissions received by the receiver, wherein the computer is further configured to:
   (1) determine the first vehicle whose transmitter transmits the unlatching signal and the second vehicle whose transmitter transmits the latching signal, (2) determine the proximity of the first vehicle that transmitted the unlatching signal relative to the second vehicle that transmitted the latch signal, (3) determine when the second vehicle is a closest vehicle that transmitted the latching signal relative to the first vehicle, and when the second vehicle is determined to be the closest vehicle to the first vehicle an inventory transfer is determined to have occurred between the first vehicle and the second vehicle, and wherein the computer is configured to record the transfer between the first vehicle and the second vehicle, to update a first record of the first vehicle to reflect that the first vehicle is no longer carrying the inventory, and to update a record of the second vehicle to reflect that the second vehicle is now carrying the inventory.

9. The system of claim 8, wherein each vehicle is one of a rubber tired gantry crane, straddle carrier, hostler, mast mounted side loader, ship-to-shore crane, reach stacker, or the like and wherein a vehicle type is assigned for each vehicle and the computer is configured to determine if the vehicle type of the first vehicle is compatible or incompatible to transfer a container to the second vehicle.

10. The system of claim 8, wherein each navigation system is a satellite positioning device or inertial navigation sensor, and wherein the computer further determines that the inventory transfer between the first vehicle and the second vehicle occurred if a location of the transmitted unlatching signal matches a location of the transmitted latching signal.

11. The system of claim 8, wherein the inventory comprises a single twenty foot freight container.

12. The system of claim 8, wherein the inventory comprises two twenty foot freight containers.

13. A method of tracking inventory, comprising the steps of:
creating a plurality of digital records, wherein each record includes position data representing a physical position of a vehicle;
updating a first position data of a first record corresponding to a first vehicle, wherein the first vehicle is carrying a first inventory item and a second inventory item, and wherein the first position data is updated with position data transmitted by and received from a first navigation system attached to the first vehicle;
unsecuring at least one of the first and second inventory item from the first vehicle whereby a signal that an unlatch event has occurred is sent by the first navigation system;
securing the at least one of the first and second inventory item to a second vehicle having a second navigation system attached thereto, whereby a latch event signal is sent from the second navigation system;
detecting the unlatch and latch event signals sent from the first and second navigation systems and determining the proximity of the first vehicle that sent the unlatch event signal relative to the second vehicle that sent the latch event signal;
comparing the first position data of the first record with the position data of the plurality of digital records to determine if the second vehicle is a closest vehicle that had a latch event, vehicle and if the second vehicle associated with the sent latch event signal is determined to be the closest vehicle to the first vehicle associated with the unlatch event signal, the at least one of the first and second inventory items carried by the first vehicle is determined to be transferred from the first vehicle to the second vehicle;
updating the first record to reflect that the first vehicle is no longer carrying at least one of the first and second inventory item; and
updating a record of the second vehicle to reflect that the second vehicle is now carrying at least one of the first and second inventory items.

14. The method of claim 13, wherein each vehicle is one of a rubber tired gantry crane, straddle carrier, mast mounted side loader, hostler, ship-to-shore crane, reach stacker, or the like and wherein a vehicle type is assigned for each vehicle and a computer is configured to determine if the vehicle type of the first vehicle is compatible or incompatible to transfer a container to the second vehicle.

15. The method of claim 13, wherein the first navigation system is a satellite positioning device or inertial navigation sensor and wherein a computer further determines that the inventory transfer between the first vehicle and the second vehicle occurred if a location of the transmitted unlatching signal matches a location of the transmitted latching signal.

16. The method of claim 13, wherein the step of securing at least one of the first and second inventory item occurs when a vehicle latches onto inventory or a fifth wheel of a truck is activated, and the step of unsecuring the at least one of the first and second inventory items occurs when a vehicle releases inventory or when the fifth wheel of the truck is activated.

17. The method of claim 13, wherein the first and second inventory items comprise a first and second twenty foot freight container.

18. The method of claim 13, wherein the first record continues to reflect that the first vehicle is carrying the second inventory item after the first record is updated.

19. The method of claim 7, further comprising the step of determining which of the two twenty-foot freight containers is transferred from the first vehicle to the second vehicle first and which is transferred second.

* * * * *